United States Patent
Turkulainen et al.

(10) Patent No.: US 8,904,537 B2
(45) Date of Patent: Dec. 2, 2014

(54) MALWARE DETECTION

(75) Inventors: Jarkko Turkulainen, Klaukkala (FI); Samuli Larvala, Helsinki (FI); Dmitriy Komashinskiy, Espoo (FI); Antti Tikkanen, Espoo (FI); Daavid Hentunen, Helsinki (FI)

(73) Assignee: F—Secure Corporation, Helsinki (FI)

( * ) Notice: Subject to any disclaimer, the term of this patent is extended or adjusted under 35 U.S.C. 154(b) by 136 days.

(21) Appl. No.: 13/068,345

(22) Filed: May 9, 2011

(65) Prior Publication Data
US 2012/0291131 A1  Nov. 15, 2012

(51) Int. Cl.
*G06F 11/00* (2006.01)
*G08B 23/00* (2006.01)
*G06F 21/56* (2013.01)
*G06F 21/55* (2013.01)
*H04L 9/32* (2006.01)
*G06F 12/14* (2006.01)
*H04L 29/06* (2006.01)

(52) U.S. Cl.
CPC ...... *G06F 21/554* (2013.01); *G06F 2221/2149* (2013.01); *G06F 21/566* (2013.01); *G06F 2221/2101* (2013.01); *H04L 63/1416* (2013.01)
USPC .............. 726/24; 726/22; 713/171; 713/193

(58) Field of Classification Search
CPC ..... H04L 63/145; G06F 21/56; G06F 21/566; G06F 21/564; G06F 21/562
USPC .......... 726/22–33, 1–3, 11–15; 713/153–154, 713/187–188, 193–194; 709/206, 249, 389
See application file for complete search history.

(56) References Cited

U.S. PATENT DOCUMENTS

| | | | |
|---|---|---|---|
| 2002/0065776 A1* | 5/2002 | Calder et al. | 705/51 |
| 2005/0097231 A1* | 5/2005 | Hofstee et al. | 710/8 |
| 2009/0222923 A1* | 9/2009 | Dixon | 726/24 |
| 2010/0005291 A1* | 1/2010 | Hulten et al. | 713/156 |
| 2011/0219449 A1* | 9/2011 | St. Neitzel et al. | 726/23 |
| 2012/0047580 A1* | 2/2012 | Smith et al. | 726/24 |
| 2012/0254993 A1* | 10/2012 | Sallam | 726/22 |

* cited by examiner

Primary Examiner — Evans Desrosiers
(74) Attorney, Agent, or Firm — Harrington & Smith

(57) ABSTRACT

A method and apparatus for detecting malware in which a computer device that has an operating system and a memory executes an untrusted computer program. In the event that the untrusted program directly accesses a region of the memory used to store information relating to the operating system, a determination is made that the untrusted program is likely to be malware.

15 Claims, 2 Drawing Sheets

MALWARE DETECTION

TECHNICAL FIELD

The invention relates to the field of malware detection.

BACKGROUND

Malware is short for malicious software and is used as a term to refer to any software designed to infiltrate or damage a computer system without the owner's informed consent. Malware can include computer viruses, worms, Trojan horses, rootkits, adware, spyware and any other malicious and unwanted software.

When a device is infected by malware program the user will often notice unwanted behaviour and degradation of system performance as the infection can create unwanted processor activity, memory usage, and network traffic. This can also cause stability issues leading to application or system-wide crashes. The user of an infected device may incorrectly assume that poor performance is a result of software flaws or hardware problems, taking inappropriate remedial action, when the actual cause is a malware infection of which they are unaware. Furthermore, even if a malware infection does not cause a perceptible change in the performance of a device, it may be performing other malicious functions such as monitoring and stealing potentially valuable commercial, personal and/or financial information, or hijacking a device so that it may be exploited for some illegitimate purpose.

Many end users make use of anti-virus software to detect and possibly remove malware. However, in order to hide the presence of malware from end users and to evade detection by anti-virus software, malware authors try to hide their malware by designing it to mask or disguise itself as legitimate processes running on the computer. The malware achieves this by injecting its executable code into another process running on the computer, the target process then blindly executes this malware code effectively concealing the source of the malicious behaviour.

One of the ways used to detect malware is to use a technique known as "sandboxing". A sandbox is a security mechanism used for executing untrusted programs. A sandbox is a confined execution environment in which the untrusted program can be executed in order to analyse the effects and actions of the untrusted program, and so determine whether or not it is malware. A sandbox environment provides controlled resources in which the program can be executed. Typically, a sandbox environment will not allow an untrusted program to access a network, inspect the host system or read from input devices. A sandbox environment can operate as a virtual machine, in which case a virtual machine is emulated and appears to have almost all the resources of an operating system.

As malware becomes more sophisticated, it is coded so as to be more effective at avoiding detection. When malware is executed in a sandbox, it can determine any anomalies between the environment in which it is executed and the expected environment of a real operating system. If it detects any differences, it can determine that it is being executed in a sandbox and so avoid behaviour that would reveal it to be malware. In this way, malware can evade detection even in a sandbox environment.

A typical method of detecting a sandbox is to compare the appearance and functionality of the environment to the real environment. This could be done by comparing the results or error codes of API functions, analyzing the content of system memory structures or analyzing the state of CPU registers after API function calls.

SUMMARY

It is an object of the invention to provide an improved method of malware detection. According to a first aspect, there is provided a method of detecting malware in which a computer device that has an operating system and a memory executes an untrusted computer program. In the event that the untrusted program directly accesses a region of the memory used to store information relating to the operating system, a determination is made that the untrusted program is likely to be malware.

As an option, the untrusted program is executed in a sandbox environment.

As a further option, the method includes marking regions of the memory used to store information relating to the operating system and monitoring direct access to the marked regions of the memory by the untrusted program. A marked region of the memory optionally includes any of:

a region that is automatically initialized by the operating system a region that is allocated by a call to a system library that returns a data structure that should not be accessed directly;

a region that is allocated by the untrusted program and passed as a parameter to a system function;

a region that includes local variables and passed as a parameter to a system function;

a region relating to code in shared libraries that are part of the operating system; and a region relating to a volatile register value created from the return of an Application Programming Interface call.

Where memory is marked, the method optionally comprises subsequently removing the marking for a marked region of the memory. In the event that the memory region is marked owing to allocation by a call to a system library that returns a data structure that should not be accessed directly, the marking is optionally removed when a request is made to free the memory. In the event that the memory region is marked because it is allocated by the untrusted program and passed as a parameter to a system function is marked, the marking is optionally removed when a call to free the memory region is made. In the event that a memory region is marked because it includes local variables and is passed as a parameter to a system function, the marking is optionally removed when either a corresponding function to uninitialize a data structure in the memory region is called, the stack pointer moves such that a local variable is no longer in the stack, and/or the memory region is written to before it is read from.

As an option, direct access to marked regions of memory includes any of direct access to marked memory regions by the untrusted program and an execution transfer to marked memory regions, unless a target of the execution transfer has the same address of an exported function.

The method optionally comprises, before determining that the untrusted program is likely to be malware, determining that the untrusted program is not provisioned in a whitelist of trusted programs. This allows some legitimate programs such as DRM programs to directly access a region of the memory used to store information relating to the operating system.

According to a second aspect, there is provided a computer device comprising a computer readable medium in the form of a memory, an operating system, and a processor for executing an untrusted computer program. The processor is arranged to determine that the untrusted program is likely to be malware in the event that the untrusted program directly accesses a region of the memory used to store information relating to the operating system As an option, the processor is further arranged to mark regions of the memory used to store information relating to the operating system and monitor direct access to the marked regions of the memory by the untrusted program. In this case, the processor is optionally arranged to mark a region of the memory selected from any of:
- a region that is automatically initialized by the operating system
- a region that is allocated by a call to a system library that returns a data structure that should not be accessed directly;
- a region that is allocated by the untrusted program and passed as a parameter to a system function;
- a region that includes local variables and passed as a parameter to a system function;
- a region relating to code in shared libraries that are part of the operating system; and
- a region relating to a volatile register value created from the return of an Application Programming Interface call.

The processor is optionally arranged to subsequently remove the marking for a marked region of the memory. In the event that the memory region is marked owing to allocation by a call to a system library that returns a data structure that should not be accessed directly, the processor is optionally arranged to remove the marking when a request is made to free the memory. In the event that the memory region is marked because it is allocated by the untrusted program and passed as a parameter to a system function is marked, the processor is optionally arranged to remove the marking when a call to free the memory region is made. In the event that a memory region is marked because it includes local variables and is passed as a parameter to a system function, the processor is optionally arranged to remove the marking when a corresponding function to uninitialize a data structure in the memory region is called, the stack pointer moves such that a local variable is no longer in the stack, and/or the memory region is written to before it is read from.

As an option, the processor is arranged to determine that direct access to marked regions of memory has occurred by determining the presence of any of direct access to marked memory regions by the untrusted program and an execution transfer to marked memory regions, unless a target of the execution transfer has the same address of an exported function.

The processor is optionally arranged to, before determining that the untrusted program is likely to be malware, determine that the untrusted program is not provisioned in a whitelist of trusted programs. This may be a remote whitelist, or a whitelist stored at the computer device.

According to a third aspect, there is provided a computer program comprising non-transitory computer readable code which, when run on a computer device, causes the computer device to perform the method described above in the first aspect.

According to a fourth aspect, there is provided a computer program product comprising a non-transitory computer readable medium and a computer program described above in the third aspect, wherein the computer program is stored on the non-transitory computer readable medium.

DETAILED DESCRIPTION

Figure 1:
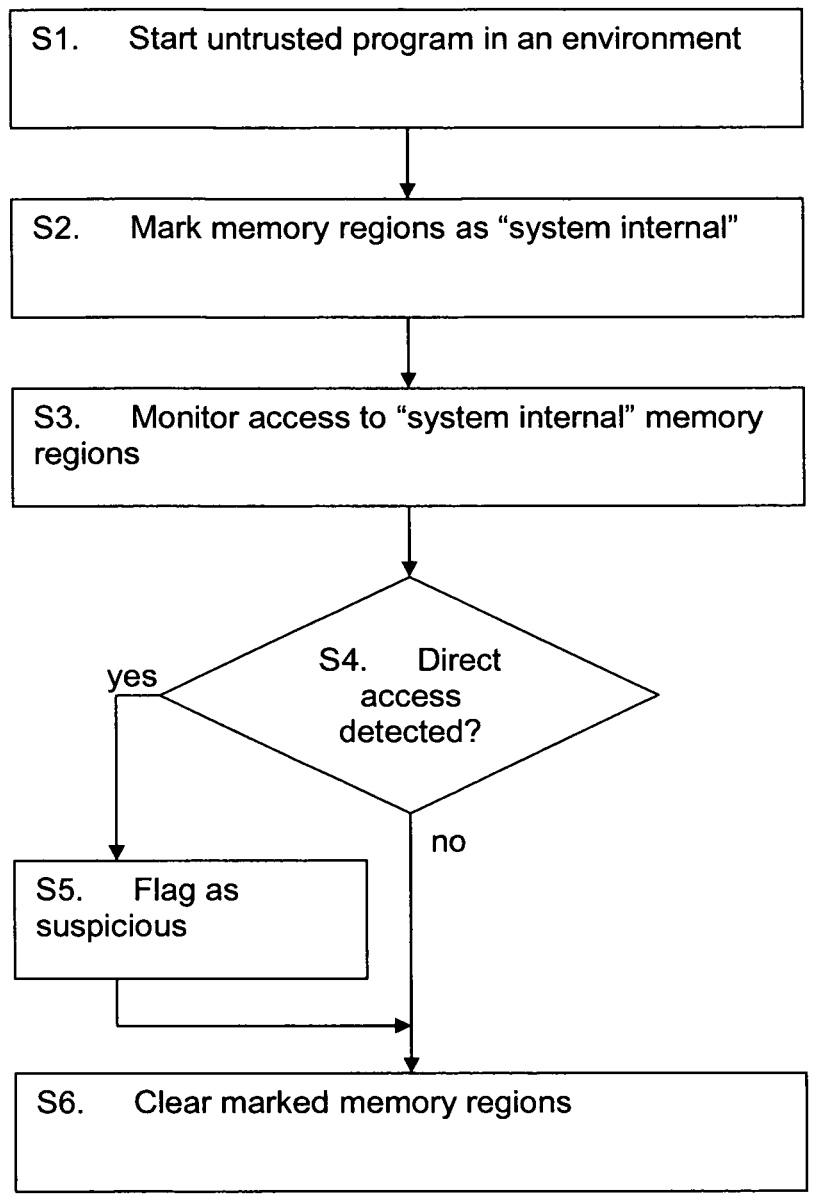
FIG. 1 is a flow diagram showing steps according to an embodiment of the invention; and 2.

Benign applications usually rely on documented Application Programming Interfaces (APIs) to interface with the Operating system. For example, native Windows applications use the Win32 API to use resources from the Operating System. These APIs are also used according to an Application Binary Interface (ABI), which formulates how parameters are passed to functions, how return values are passed back and which CPU registers are guaranteed to be preserved over function calls.

Benign computer programs therefore do not directly access the content of a computer device memory (either data or code) that is internal to the operating system being run on the computer device. Instead, benign applications access and use such data structures using API calls that are provided by the operating system. An API is a set of instructions and specifications that the benign computer program follows to access the data or code internal to the operating system. The API acts as an interface between the benign computer program and the data or code provided by the operating system, and facilitates their interaction.

Similarly, a benign computer program normally follows a certain pattern in how it executes code in a system library. Typically, the benign computer program will transfer control to the beginning of exported functions in shared system libraries.

Many malicious applications, on the other hand, directly access the content of memory internal to the operating system without using an API. One reason why malware directly access memory internal to the operating system is so that it can determine the contents of OS process-wide data structures, such as the Process Environment Block (PEB) in Windows®. This allows the malware to compare the contents of the structure to what would be expected in a real environment to determine whether or not it is executing in a sandbox.

A further reason that malware may directly access the content of memory internal to the operating system without using an API is because it wishes to transfer execution to the middle of system library functions. The malware may wish to transfer execution to an address just before the start of the function. For example, for modern Microsoft Windows platforms it is possible to use a so-called 'hot-patching zone' of binary placed immediately before a patchable API function of a system library and filled in by 'no-operation' instruction opcodes; this specificity of the OS-related mechanism makes it possible to call some API functions through an invalid virtual address. These techniques allow the malware to verify that library functions are implemented in the same way as in a real system to avoid being detected in a sandbox by verifying that the hot-patching zone exists, and has the same contents as the real environment.

Furthermore, malware may directly access the content of memory internal to the operating system without using an API in order to determine the content of data structures (for example, CRITICAL_SECTION in Windows) to make sure the emulated operating system implements those structures in the same way as a real system to avoid being detected in a sandbox.

According to Windows ABI, certain registers are considered volatile; in other words, the register values cannot be trusted after returning from a Windows API function. Because of the ABI, programs should not expect fixed vales in volatile registers. Volatile registers in 32-bit Windows ABI are EAX, ECX and EDX. On the AMD64 platform, volatile registers are RAX, RCX, RDX, R8, R9, R10 and R11. In practice, volatile registers usually contain information about the API function when the function returns. Some of this information, like the return value in EAX/RAX, is documented. On the other hand, information contained in other registers is undocumented and likely to vary between different API implementations. Using these register values right after the function call is considered to be bad programming practice, and none of the code compiled with high-level language compilers depends on these values.

Malware can exploit the Windows API implementation very effectively by inspecting the values of volatile registers. In certain cases, volatile registers contain deterministic values after an API call. For example, the registers ECX and EDX can be expected to contain fixed values after a GetProcAddress call and the malware could simply verify these values after the function call. However, because the ABI defines these registers as volatile, this behaviour can be identified as suspicious.

Direct access to the content of memory internal to the operating system is a strong indication that a program attempting to access the memory is malware, and further investigations can be carried out.

FIG. 1 shows steps of an embodiment of the invention, with the following numbering corresponding to that of FIG. 1:

S1. In order to determine whether or not an untrusted binary executable is malware, it is loaded either into an emulator that emulates a computer device running a real operating system, or it is loaded as a process in a real operating system.

S2. As the untrusted program executes in the environment, certain parts of the execution state are marked as "system internal". System internal memory regions includes memory regions specific to the operating system (or emulated operating system). These memory regions may include any of:

a. Memory regions that are automatically initialized and used by the Operating System are marked as "system internal". For example, such a region in Windows is the Process Environment Block.

b. Memory regions that are allocated by a call to a system library that returns data which should not be accessed directly are marked as "system internal". For example, an application may call HeapCreate to create a new memory heap. The application receives a HANDLE to the heap. This HANDLE is a pointer to an undocumented heap object (_HEAP). The application can read the contents of this object to verify that the heap manager is behaving in the same way as a genuine Windows heap manager.

c. Memory regions that are allocated by the untrusted program itself from the heap and passed as a parameter to a system function (for example, a CRITICAL_SECTION passed to InitializeCriticalSection in Windows) are marked as "system internal".

d. Memory regions that are local variables (in the stack) and passed as a parameter to a system function (an example of such a memory region in Windows is a CRITICAL_SECTION passed to InitializeCriticalSection) are marked as "system internal".

e. Memory regions relating to code in shared libraries that are part of the operating system are marked as "system internal".

f. The CPU registers that are volatile and contain undefined values after calls to system API's are marked as "system internal" memory for the read operation.

In some cases, any memory region that is not part of the untrusted program code, not allocated by the untrusted program from the heap, and not belonging to the untrusted program stack(s) may be considered as "system internal". Note that rather than marking memory regions as system internal, they may be identified as system internal on the fly.

S3. During execution of the untrusted program, access to "system internal" memory is monitored, by determining if regions of memory are accessed that are marked as "system internal".

S4. If any direct access to system internal memory regions is detected, this is flagged as suspicious (step S5); otherwise the method optionally proceeds at step S6. The following direct access may be detected:

a. Any direct access from application code to "system internal" data regions is flagged as suspicious.

b. Any execution transfer from the application code to "system internal" code regions is flagged as suspicious, unless the target of the execution transfer is the exact address of an exported function.

S5. The direct accessing of system internal memory is flagged as suspicious.

Note that the reading of CPU registers that are marked as "system internal" memory is flagged as suspicious. A read operation covers all instructions where the value of the register somehow affects the flow of execution. For example, using the register value n, a comparison operation is considered suspicious, whereas a write operation to those registers is not considered suspicious.

S6. Memory that is marked as "system internal" may be cleared and not considered as "system internal" by any of the following mechanisms:

a. Where memory regions that are allocated by a call to a system library that returns a data structure that should not be accessed directly were marked as "system internal" (step S2b), the marking is cleared when the system is requested to free the memory.

b. Where memory regions that are allocated by the untrusted program itself from the heap, and passed as a parameter to a system function, were marked as "system internal" (step S2c), the memory region is cleared when a call to free the memory region is made. This differs from a) above, as an example flow according to a) is that the application calls HeapCreate, gets a HANDLE that should not be accessed and then frees it with HeapDestroy. In contrast, using b), the application itself allocates some memory (for example, for a CRITICAL_SECTION), then passes it to an API such as InitializeCriticalSection, and then requests deletion using DeleteCriticalSection, and finally probably frees the memory.

c. Where memory regions that are local variables (in the stack) and passed as a parameter to a system function were marked as "system internal" (step S2d), the memory may be cleared at one of several points:

i. If a corresponding function to uninitialize the data structure is called (in that case, DeleteCriticalSection), the memory region is cleared.

ii. If the stack pointer moves so that a local variable is left "outside" the stack, the memory region is cleared.

iii. If the memory region is written to before it is read from, it is cleared. If a write operation is detected before a read operation, then it is assumed that this memory region is being taken for another use by another function.

The invention may be used to detect malware in a sandbox environment, in which a real environment is emulated. Alternatively, it may be used in a real system by using an instrumentation library such as DynamoRIO, which allows manipulation of the untrusted program running on an operating system, allowing a user to analyse the untrusted program's runtime code stream.

If an instance of direct access to a marked memory region is flagged as suspicious, further action may be taken. For example, the untrusted program may be terminated and quarantined for further investigation. In a scenario in which an anti-virus application is provided from a remote server, or the provider of the anti-virus application wishes to obtain up to date information about potential malware, then information relating to the untrusted program may, in some case, be sent to a remote device.

Note that some legitimate applications may also attempt to directly access system internal regions of the memory. In order to avoid these applications from being identified as malware, a "whitelist" of programs that attempt to directly access system internal regions of the memory may be provided either locally at the device or remotely from a server. The whitelist may include the identity of the application, a hash of an image of the application, or the signer of the application. An example of a legitimate application that directly accesses system internal regions of the memory includes digital rights management (DRM) applications.

Figure 2:
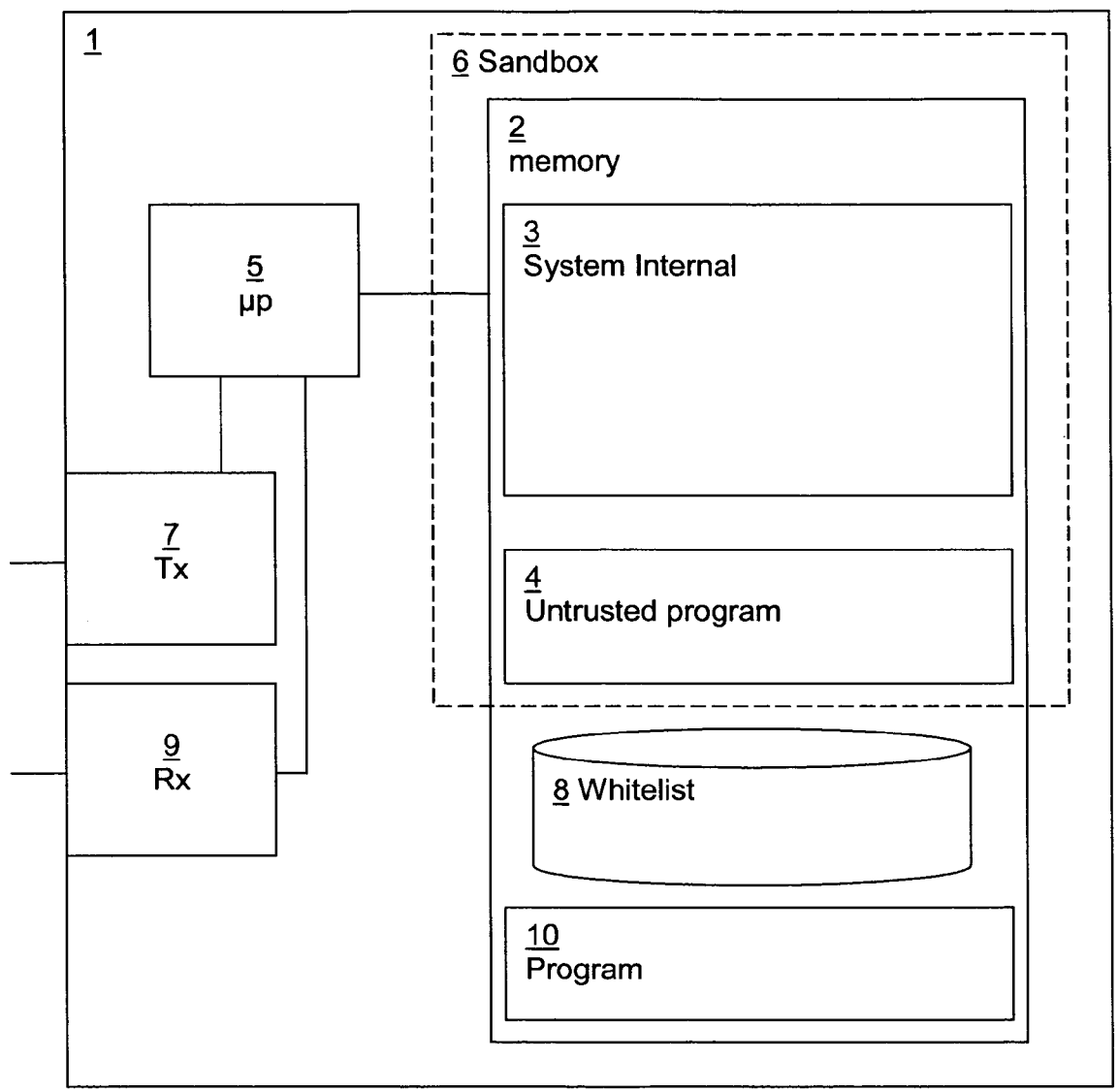
FIG. 2 illustrates schematically in a block diagram a computer device according to an embodiment of the invention.

Referring to FIG. 2, there is illustrated an exemplary computer device 1. The computer device 1 is provided with a computer readable medium in the form of a memory 2, which has regions. Some of these memory regions are "system internal" memory regions 3, as described above.

The memory 2 may also be used to store the untrusted program 4, although it will be appreciated that in other embodiments the untrusted program nay be stored in a different memory (not shown). A processor 5 is used to execute the untrusted program 4, and to mark system internal regions of the memory 3. The processor 5 is also used to determine whether or not the untrusted program 4 attempts to directly access system internal regions of the memory 3. Note that, as mentioned above, the memory may be a confined execution environment such as a sandbox 6. Alternatively, the processor 5 and memory 2 are part of a real system.

A transmitter 7 may also be provided to send information relating to the untrusted program 4 to a remote server. The information may include any of the name, location, file size, hash and so on of the untrusted program 4. Additional information may include the regions, or the nature of the regions that the untrusted program 4 attempted to directly access.

In the embodiment described above where a whitelist is used, either a local whitelist 8 is stored at the memory. Alternatively, the whitelist is stored remotely at a back-end server, in which case the transmitter 7 may be used to send queries to the server, and a receiver 9 is provided to receive responses to queries from the server.

A computer program 10 may also be stored at the memory 2. When the computer program 10 is executed by the processor, it causes the processor to behave as described above.

The method and apparatus described above allow malware to be detected without the need to compare an untrusted program with malware definitions stored in a database. This greatly reduces the time required to detect malware. Furthermore, the invention assists in detecting malware in a sandbox environment in particular because tracking access to system internal memory is easily done in a sandbox environment.

It will be appreciated by the person of skill in the art that various modifications may be made to the above-described embodiments without departing from the scope of the present invention.

The invention claimed is:

1. A method of detecting malware, the method comprising:
at a computer device having an operating system and a memory, executing an untrusted computer program in a sandbox environment; and
in the event that the untrusted program directly accesses a region of the memory used to store information relating to the operating system, determining that the trusted program is likely to be malware, the method further comprising:
marking regions of the memory used to store information relating to the operating system; and
monitoring direct access to the marked regions of the memory by the untrusted program, wherein a marked region of the memory includes any of:
a region that is automatically initialized by the operating system;
a region that is allocated by a call to a system library that returns a data structure that should not be accessed directly;
a region that is allocated by the untrusted program and passed as a parameter to a system function;
a region that includes local variables and passed as a parameter to a system function;
a region relating to code in shared libraries that are part of the operating system;
and a region relating to a volatile register value created from the return of an application programming interface call; the method further comprising: in the event that the memory region is marked owing to allocation by a call to a system library that returns a data structure that should not be accessed directly, removing the marking when a request is made to free the memory.

2. The method according to claim 1, further comprising subsequently removing the marking for a marked region of the memory.

3. The method according to claim 1, further comprising, in the event that the memory region is marked because it is allocated by the untrusted program and passed as a parameter to a system function is marked, removing the marking when a call to free the memory region is made.

4. The method according to claim 1, further comprising, in the event that a memory region is marked because it includes local variables and is passed as a parameter to a system function, removing the marking when any of a corresponding function to uninitialize a data structure in the memory region is called, the stack pointer moves such that a local variable is no longer in the stack, and the memory region is written to before it is read from.

5. The method according to claim 1, wherein direct access to marked regions of memory includes any of:
direct access to marked memory regions by the untrusted program; and
an execution transfer to marked memory regions, unless a target of the execution transfer has the same address of an exported function.

6. The method according to claim 1, further comprising, prior to determining that the untrusted program is likely to be malware, determining that the untrusted program is not provisioned in a whitelist of trusted programs.

7. A computer device comprising:
a computer readable medium in the form of a memory;
an operating system; and
a processor for executing an untrusted computer program in a sandbox environment;
wherein the processor is arranged to determine that the untrusted program is likely to be malware in the event that the untrusted program directly accesses a region of the memory used to store information relating to the operating system, wherein the processor is further arranged to mark regions of the memory used to store information relating to the operating system and monitor direct access to the marked regions of the memory by the untrusted program, and wherein the processor is arranged to mark a region of the memory selected from any of:
a region that is automatically initialized by the operating system;
a region that is allocated by a call to a system library that returns a data structure that should not be accessed directly;
a region that is allocated by the untrusted program and passed as a parameter to a system function;
a region that includes local variables and passed as a parameter to a system function;
a region relating to code in shared libraries that are part of the operating system; and
a region relating to a volatile register value created from the return of an application programming interface call;
wherein the processor is further arranged to, in the event that the memory region is marked owing to allocation by a call to a system library that returns a data structure that should not be accessed directly, remove the marking when a request is made to free the memory.

8. The computer device according to claim 7, wherein the processor is further arranged to subsequently remove the marking for a marked region of the memory.

9. The computer device according to claim 7, wherein the processor is arranged to, in the event that the memory region is marked because it is allocated by the 30 untrusted program and passed as a parameter to a system function is marked, remove the marking when a call to free the memory region is made.

10. The computer device according to claim 7, wherein the processor is arranged to, in the event that a memory region is marked because it includes local variables and is passed as a parameter to a system function, remove the marking when any of a corresponding function to uninitialize a data structure in the memory region is called, the stack pointer moves such that a local variable is no longer in the stack, and the memory region is written to before it is read from.

11. The computer device according to claim 7, wherein the processor is arranged to determine that direct access to marked regions of memory has occurred by determining the presence of any of:
direct access to marked memory regions by the untrusted program; and
an execution transfer to marked memory regions, unless a target of the execution transfer has the same address of an exported function.

12. The computer device according to claim 7, wherein the processor is arranged to, prior to determining that the untrusted program is likely to be malware, determine that the untrusted program is not provisioned in a whitelist of trusted programs.

13. The computer device according to claim 12, further comprising a whitelist of trusted programs.

14. A non-transitory computer readable medium including a computer program which, when run on a computer device, causes the computer device to perform the method according to claim 1.

15. The non-transitory computer readable medium including the computer program according to claim 14, wherein the computer program is stored on the non-transitory computer readable medium.

* * * * *